United States Patent
Youn et al.

(10) Patent No.: US 8,044,139 B2
(45) Date of Patent: Oct. 25, 2011

(54) FIBER REINFORCED NYLON COMPOSITION

(75) Inventors: Bum-Seok Youn, Seoul (KR); Chang-Min Hong, Uiwang-si (KR); Tae-Uk Kim, Suwon-si (KR); Young-Jun Lee, Yongin-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/824,267

(22) Filed: Jun. 28, 2010

(65) Prior Publication Data

US 2010/0324188 A1    Dec. 23, 2010

Related U.S. Application Data

(63) Continuation-in-part of application No. PCT/KR2008/007746, filed on Dec. 29, 2008.

(30) Foreign Application Priority Data

Dec. 28, 2007   (KR) .................. 10-2007-0140955

(51) Int. Cl.
*C08L 77/00*   (2006.01)

(52) U.S. Cl. ........ 524/606; 524/607; 524/492; 524/493; 524/494; 524/495; 524/538

(58) Field of Classification Search .......... 524/606, 524/607, 492, 493, 494, 495, 538
See application file for complete search history.

(56) References Cited

U.S. PATENT DOCUMENTS

| | | | |
|---|---|---|---|
| 4,485,214 A | 11/1984 | Ochiai et al. | |
| 5,013,786 A | 5/1991 | Payne et al. | |
| 6,306,951 B1 * | 10/2001 | Montag et al. | 524/505 |
| 7,147,288 B2 | 12/2006 | Grasse et al. | |
| 2004/0242737 A1 * | 12/2004 | Topulos | 524/115 |
| 2006/0124906 A1 | 6/2006 | Bradley et al. | |
| 2009/0258967 A1 * | 10/2009 | Park et al. | 523/201 |
| 2010/0324188 A1 | 12/2010 | Youn et al. | |

FOREIGN PATENT DOCUMENTS

| | | |
|---|---|---|
| EP | 0826731 A1 | 3/1998 |
| JP | 58-076431 | 5/1983 |

(Continued)

OTHER PUBLICATIONS

Machine Translation of JP 07010591 (2011).*

(Continued)

*Primary Examiner* — Vasu Jagannathan
*Assistant Examiner* — Mark Kaucher
(74) *Attorney, Agent, or Firm* — Summa, Additon & Ashe, P.A.

(57) ABSTRACT

The present invention relates to a fiber reinforced nylon composition, wherein the composition includes (A) 25 to 75 parts by weight of a polyarylamide resin, (B) 25 to 75 parts by weight of a reinforcing fiber having a cross-sectional aspect ratio of 1.5 or more, and (C) an impact modifier, and the impact modifier is included in an amount of 1 to 10 parts by weight based on 100 parts by weight of a mixture of the polyarylamide resin and the reinforced fiber. According to the present invention, the fiber reinforced nylonresin composition may exhibit minimal or no warpage, can have excellent fluidity and impact resistance, and can provide high whiteness and a glossy-coating due to minimal or no surface change after dipping in boiling water.

16 Claims, 4 Drawing Sheets

FOREIGN PATENT DOCUMENTS

| | | |
|---|---|---|
| JP | 60-018542 | 1/1985 |
| JP | 02-004861 | 1/1990 |
| JP | 02-088671 | 3/1990 |
| JP | 07-018186 A | 1/1995 |
| JP | 07010591 A * | 1/1995 |
| JP | 07-233321 A | 9/1995 |
| JP | 10077405 A | 3/1998 |
| JP | 10-169640 | 6/1998 |
| JP | 10-265666 A | 10/1998 |
| KR | 1020070039610 A | 4/2007 |
| KR | 10-0723248 B1 | 5/2007 |
| KR | 756349 * | 11/2007 |
| KR | 10-0810966 B1 | 2/2008 |
| WO | 90/03418 A1 | 4/1990 |
| WO | 2008/075809 A1 | 6/2008 |
| WO | 2009/084892 A2 | 7/2009 |

OTHER PUBLICATIONS

International Search Report and Written Opinion in counterpart International Application No. PCT/KR2008/007746, dated Aug. 17, 2009.

International Search Report in commonly owned International Application No. PCT/KR2006/005622, mailed Sep. 3, 2007, pp. 1-3.

Office Action in commonly owned U.S. Appl. No. 12/486,862 dated Mar. 11, 2011, pp. 1-12.

* cited by examiner

[FIG. 1]
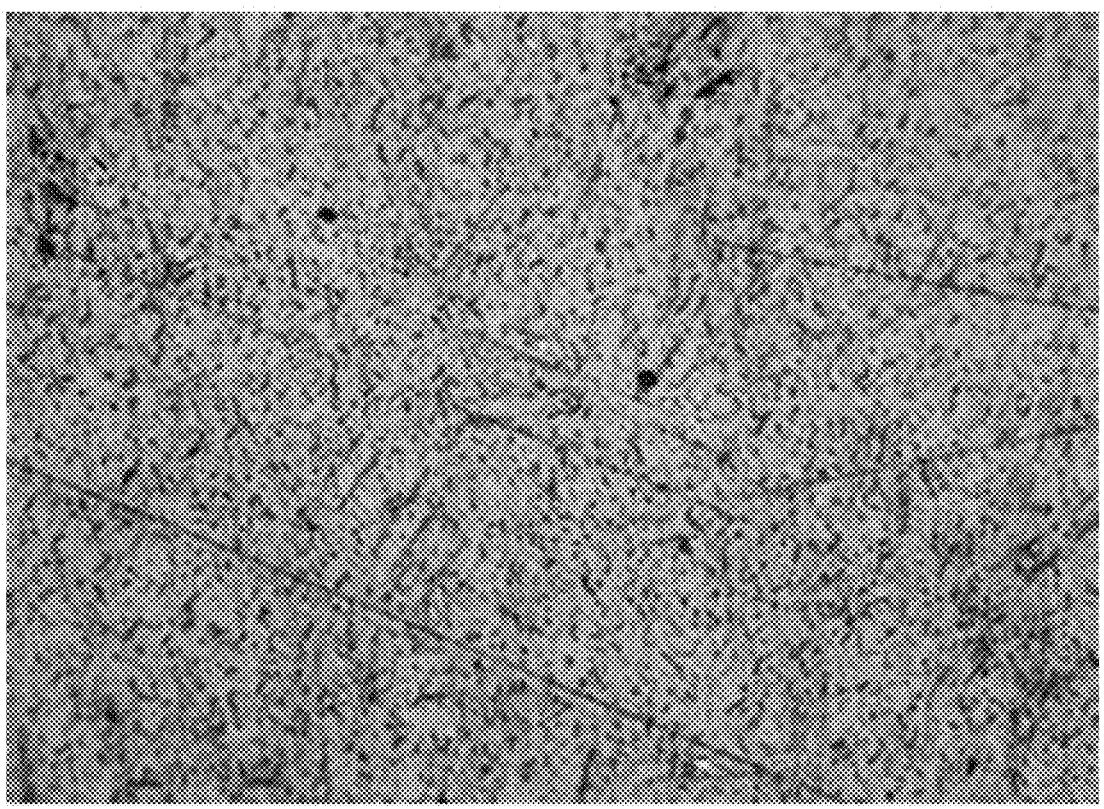

[FIG. 2]
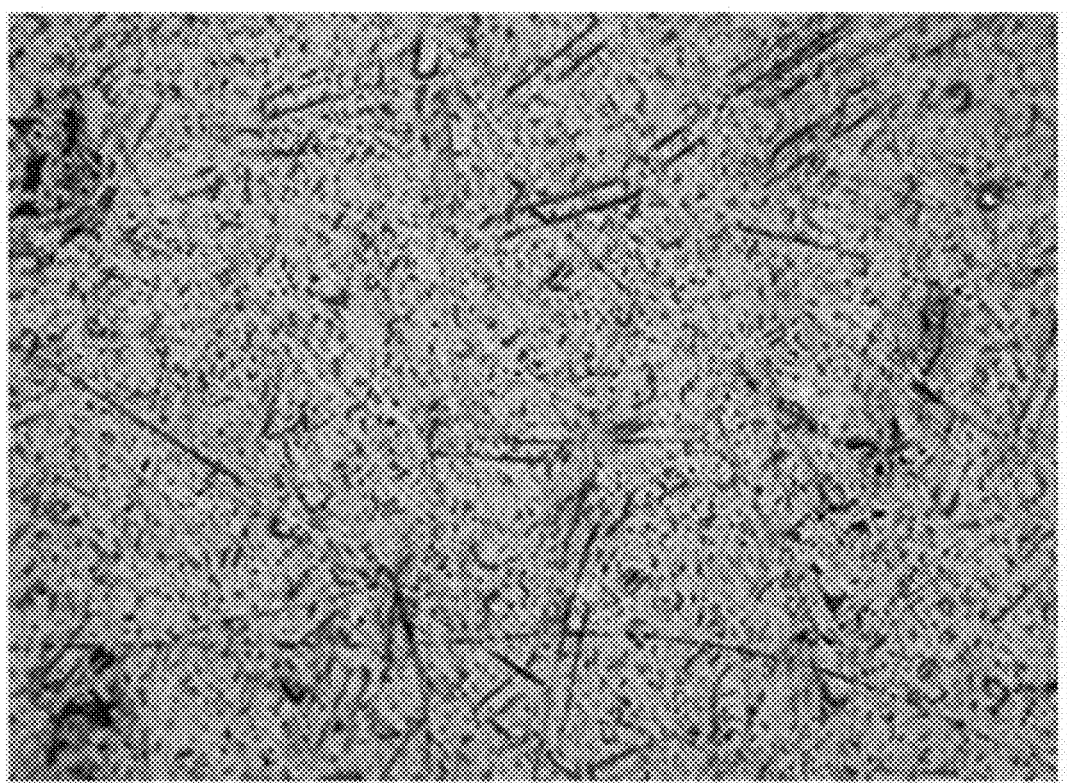

[FIG. 3]
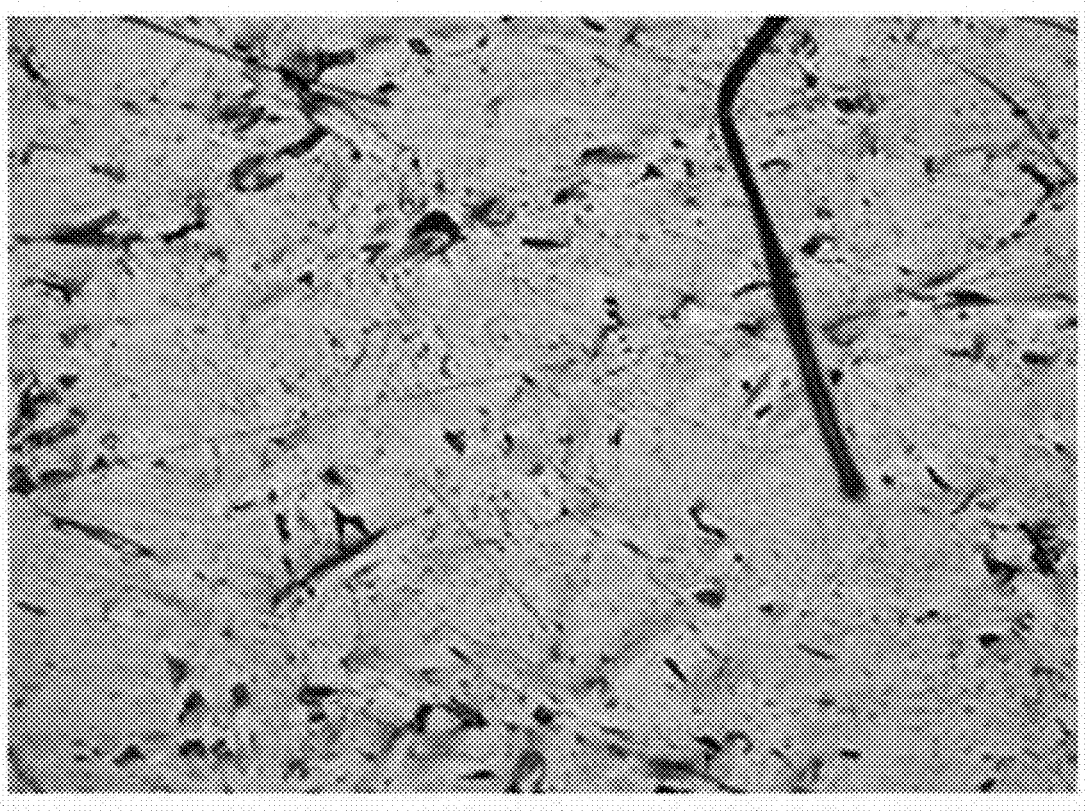

[FIG. 4]
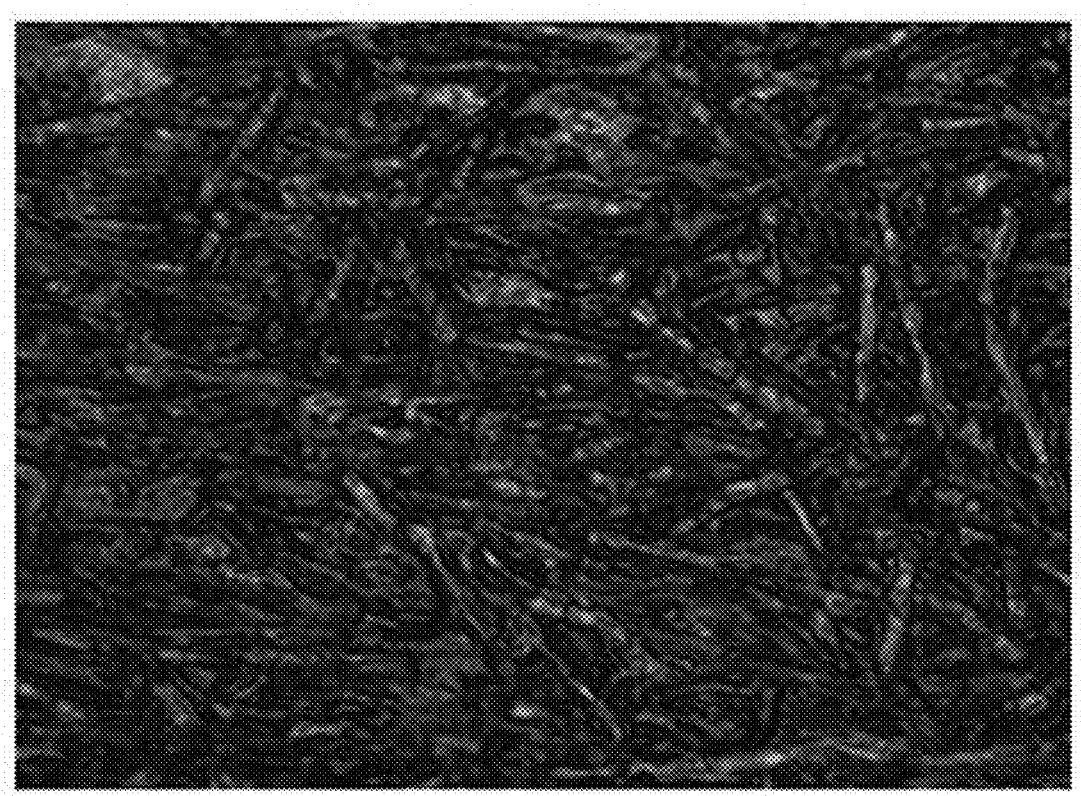

FIBER REINFORCED NYLON COMPOSITION

CROSS-REFERENCE TO RELATED APPLICATIONS

This application is a continuation-in-part of International Application No. PCT/KR2008/007746, filed Dec. 29, 2008, pending, which designates the U.S., published as WO 2009/084892, and is incorporated herein by reference in its entirety, and claims priority therefrom under 35 USC Section 120. This application also claims priority under 35 USC Section 119 from Korean Patent Application No. 10-2007-0140955, filed Dec. 28, 2007, in the Korean Intellectual Property Office, the entire disclosure of which is also incorporated herein by reference.

FIELD OF THE INVENTION

The present invention relates to a fiber reinforced nylon composition.

BACKGROUND OF THE INVENTION

Nylon-based resins include engineering resins widely used as materials for interior and exterior components of automobiles. However, nylon-based resins can absorb moisture and thus can lack dimensional stability and can warp. An inorganic modifier such as glass fiber can be added to nylon resins to overcome these problems. Fiber reinforced nylon resins can be widely used for applications requiring excellent mechanical strength and heat resistance, such as structural materials, automobile interior and exterior materials, and the like.

However, adding an inorganic modifier can deteriorate impact resistance. Accordingly, there have been recent attempts to improve the high moisture absorption properties of conventional nylon by adding a modified nylon having a benzene ring in the main chain, and to improve the impact strength of a mixture of nylon and an inorganic modifier by further adding an impact modifier. Nevertheless, adding the modified nylon may not sufficiently improve moisture absorptiveness and further can cause dimensional instability and warpage. In addition, adding the modified nylon may not overcome the problems of decreased mechanical strength even when an impact modifier is added.

In addition, when nylon resin is reinforced with an inorganic modifier such as glass fiber, a large amount of inorganic impact modifier is typically used to provide high whiteness due to the intrinsic color of resin. Accordingly, the glass fiber is shortened or the surface of the glass fiber is scratched due to friction between the inorganic impact modifier and the glass fiber reinforcing material, so the impact resistance and impact strength are decreased. Due to the intrinsic characteristics of the resin, this can also generate a phenomenon in which the surface of the resin becomes rougher after dipping in boiling water, which can reduce its usefulness in applications requiring a glossy surface.

SUMMARY OF THE INVENTION

One embodiment of the present invention provides a fiber reinforced nylon composition which can exhibit minimal or no warpage and which can have excellent fluidity and impact resistance. The fiber reinforced nylon composition of the invention further can exhibit minimal or no surface change after dipping in boiling water. The fiber reinforced nylon compositions can accordingly exhibit high whiteness and a glossy-coating with minimal or no reduction in other properties.

Another embodiment of the present invention provides a molded product manufactured using the composition.

The embodiments of the present invention are not limited to the above technical purposes, and a person of ordinary skill in the art can understand other technical purposes.

According to one embodiment, a fiber reinforced nylon composition is provided that includes (A) 25 to 75 parts by weight of a polyarylamide resin and (B)25 to 75 parts by weight of a reinforcing fiber having a cross-sectional aspect ratio of 1.5 or more, and an impact modifier. The impact modifier is included in an amount of 1 to 10 parts by weight based on 100 parts by weight of a mixture of (A) the polyarylamide resin and (B) the reinforcing fiber.

According to another embodiment of the present invention, a molded product manufactured using the composition is provided.

Hereinafter, further embodiments of the present invention will be described in detail.

The fiber reinforced nylon composition according to the present invention may exhibit minimal or no warpage and can have excellent fluidity and impact resistance, and is capable of realizing high whiteness and a glossy-coating due to no or minimal surface change after dipping in boiling water. Therefore, it can be useful in the production of products such as mobile phone housings that can require excellent surface characteristics and other properties.

BRIEF DESCRIPTION OF THE DRAWINGS

FIG. 1 is a photograph showing a surface of the specimen according to Example 1 of the present invention before it is dipped in boiling water.

FIG. 2 is a photograph showing a surface of the specimen according to Example 1 of the present invention after it is dipped in boiling water.

FIG. 3 is a photograph showing a surface of the specimen according to Comparative Example 1 before it is dipped in boiling water.

FIG. 4 is a photograph showing a surface of the specimen according to Comparative Example 1 after it is dipped in boiling water.

DETAILED DESCRIPTION OF THE INVENTION

The present invention now will be described more fully hereinafter in the following detailed description of the invention and with reference to the accompanying drawings, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

One embodiment of the present invention provides a fiber reinforced nylon composition. Particularly, the present invention provides a resin composition that can exhibit improved dimensional instability and reduced warpage, and that is capable of realizing high whiteness and having minimal or no surface change after dipping in boiling water.

According to one embodiment of the present invention, it is possible to realize the high whiteness and minimal or no surface change by using a polyarylamide (such as the reaction product of adipic acid and m-xylenediamine). The warpage phenomenon can be improved by using a reinforcing fiber, such as a plate-shaped glass fiber, having a cross-sectional aspect ratio of 1.5 or more.

Exemplary components will hereinafter be described in detail.

(A) Polyarylamide

The polyarylamide (such as the reaction product of adipic acid and m-xylenediamine) resin can have a density of 1.2 to 1.25 g/cm³, a melt index (melt flow index) of 23±5 (250° C., 2.16 kg, and aging for 5 minutes), and a melting point of 220 to 260° C. The polyarylamide resin includes a benzene ring in the main chain, and can have a weight average molecular weight of 10,000 to 100,000.

An exemplary polyarylamide resin is represented by the following Chemical Formula 1 and can be produced by reacting adipic acid of the following Chemical Formula 2 and meta-xylenediamine of the following Chemical Formula 3. In the present invention, the polyarylamide resin may be a resin prepared by reacting adipic acid of the following Chemical Formula 2 and meta-xylenediamine of the following Chemical Formula 3, or may be commercially available:

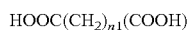

[Chemical Formula 2]

wherein, in the above formula, n1 ranges from 50 to 5000.

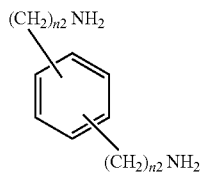

[Chemical Formula 3]

wherein, in the above formula, n2 ranges from 50 to 5000.

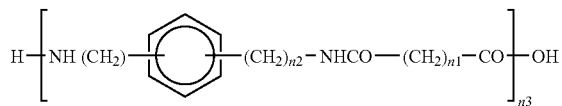

[Chemical Formula 1]

wherein, in the above formula, n1 ranges from 50 to 5000, n2 ranges from 50 to 5000, and n3 ranges from 50 to 5000.

The fiber reinforced nylon composition according to the present invention includes the polyarylamide resin (A) in an amount of 25 to 75 parts by weight, for example 40 to 60 parts by weight, based on the total weight of a mixture of the polyarylamide resin (A) and the reinforcing fiber (B). In some embodiments, the fiber reinforced nylon composition includes the polyarylamide resin (A) in an amount of 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 parts by weight. Further, according to some embodiments of the present invention, the amount of the polyarylamide resin (A) can be in a range from any of the foregoing amounts to any other of the foregoing amounts.

When the polyarylamide resin is included in an amount of 25 to 75 parts by weight, production processes can be stably performed, and mechanical strength may be improved.

(B) Reinforcing Fiber

According to one embodiment, the reinforcing fiber has a cross-sectional aspect ratio of 1.5 or more, and in another embodiment, a cross-sectional aspect ratio from 2 to 8. The cross-sectional aspect ratio is calculated by dividing the length of the major axis by the length of the minor axis Examples of the reinforcing fiber may include without limitation a glass fiber, a carbon fiber, an aramide fiber, a potassium titanate fiber, a silicon carbonate fiber, and the like.

In addition, the reinforcing fiber may include a plate-shaped reinforcing fiber having a reinforcing fiber length of 2 to 13 mm.

The plate-shaped reinforcing fiber has a cross-sectional aspect ratio of 1.5 or more. The cross-sectional aspect ratio is defined as "a/b" wherein "a" is the longest diameter (length) of the cross-section of reinforcing fiber, and "b" is the shortest diameter (width) thereof. The cross-sectional aspect ratio is advantageously between 2 and 8, which can provide a balance between mechanical properties and warpage properties. In some embodiments, cross-sectional aspect ratio of the reinforcing fiber can be 1.5, 2, 2.5, 3, 3.5, 4, 4.5, 5, 5.5, 6, 6.5, 7, 7.5, or 8. Further, according to some embodiments of the present invention, the cross-sectional aspect ratio of the reinforcing fiber can be in a range from any of the foregoing amounts to any other of the foregoing amounts.

According to another embodiment, the reinforcing fiber can be coated with a surface modifier on the surface in order to increase the adhesive strength to polyarylamide resin. Examples of the surface modifier may include without limitation urethane, an epoxy compound, and the like.

The surface of the reinforcing fiber may be coated using conventional coating processes such as but not limited to dip-coating, spray coating, and the like.

According to one embodiment, the fiber reinforced nylon composition includes the reinforcing fiber in an amount of 25 to 75 parts by weight, for example 40 to 60 parts by weight, based on the total weight of a mixture of the polyarylamide resin (A) and the reinforcing fiber (B). In some embodiments, the fiber reinforced nylon composition includes the reinforcing fiber (B) in an amount of 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 parts by weight. Further, according to some embodiments of the present invention, the amount of the reinforcing fiber (B) can be in a range from any of the foregoing amounts to any other of the foregoing amounts. Including the reinforcing fiber in an amount within these ranges can improve the mechanical strength of the fiber reinforced nylon composition and also can stabilize the process of producing the same.

(C) Impact Modifier

The impact modifier may include an olefin-based copolymer including a reactive compound and/or a non-reactive metal. The olefin-based copolymer including a non-reactive metal may include an olefin-based copolymer having a non-reactive metal at a terminal portion thereof.

Examples of the olefin-based copolymer include without limitation ethylene/propylene rubber, isoprene rubber, ethylene/octene rubber, ethylene-propylene-diene terpolymer (EPDM), ethylene-(meth)acryl acid (EMAA), and the like, and mixtures thereof.

The olefin-based copolymer including the reactive compound can be obtained by a graft polymerization reaction of 99.9 to 95 wt % of an olefin-based polymer and 0.1 to 5 wt % of a reactive compound. Examples of the reactive compound include without limitation maleic anhydride, glycidylmethacrylate, oxazoline, and the like.

The non-reactive metal may include zinc (Zn), iron (Fe), or manganese (Mn). The non-reactive metal may also be used as a mixture thereof, and in one embodiment it includes zinc (Zn).

The olefin-based copolymer including the reactive compound and/or non-reactive metal may be produced using conventional techniques known in the art by a person of ordinary skill in the art without undue experimentation, and accordingly a detailed description thereof is not included herein. The impact modifier may be obtained by preparing an olefin-reactive copolymer including a reactive compound and/or a non-reactive metal, or a commercially available impact modifier may be used.

In one embodiment, the impact modifier is added to the fiber reinforced nylon composition in an amount of 1 to 10 parts by weight, for example 3 to 7 parts by weight, based on 100 parts by weight of the mixture of the polyarylamide resin (A) and reinforcing fiber (B). In some embodiments, the fiber reinforced nylon composition includes the impact modifier in an amount of 1, 2, 3, 4, 5, 6, 7, 8, 9 or 10 parts by weight. Further, according to some embodiments of the present invention, the amount of the impact modifier can be in a range from any of the foregoing amounts to any other of the foregoing amounts. When the impact modifier is included in an amount within these ranges, it can provide sufficient impact reinforcing effect, the fluidity and mechanical properties may be improved, and there can be minimal or no peeling during injection molding.

The fiber reinforced polyarylamide composition may further include one or more common (conventional) additives as known in the art, such as but not limited to a pigment such as ZnS, an antioxidant, a heat stabilizer, a photo-stabilizer, a fluidity enhancer, a lubricant, a bactericide, a release agent, a nucleating agent, and the like, and mixtures thereof, as long as the additive does not deteriorate the properties of the composition. The additive may be added in an amount of 30 parts by weight or less based on 100 parts by weight of the mixture of the polyarylamide resin (A) and reinforcing fiber (B). In some embodiments, the fiber reinforced nylon composition can include one or more additives each in an amount of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the additive(s) can be in a range from any of the foregoing amounts to any other of the foregoing amounts.

According to another embodiment, a molded product prepared using the fiber reinforced nylon composition is provided. The molded product can be used in various products, and can be particularly suitable for use as a structural material or an automobile interior or exterior material and the like requiring excellent mechanical strength and heat resistance.

Hereinafter, the present invention is illustrated in more detail with reference to examples. However, the embodiments of the present invention are exemplary, and the present invention is not limited thereto.

EXAMPLES

Each of the components in the examples and comparative examples are as follows.

(A) Polyarylamide (Adipic acid and m-xylenediamine)

In the examples, a polyarylamide MXD-6 (adipic acid and m-xylenediamine) manufactured by Toyobo containing a benzene ring in a main chain and having a weight average molecular weight of 10,000 to 100,000, a density of 1.2 to 1.25 g/cm$^3$, a melt flow index of 23±5 (250° C., 2.16 kg, 5 min aging), and a melting point of 235° C. is used.

(A-1) Modified Nylon-Based Thermoplastic Resin

A modified nylon resin of polyphthalamide (HTN-501 manufactured by Dupont) is used as a modified nylon-based thermoplastic resin.

(B) Reinforcing Fiber

Glass fiber (CSG 3PA-820 manufactured by Japan Nitto Boseki) having a cross-sectional aspect ratio of 4 is used as a reinforcing fiber.

(C) Impact Modifier

Fusabond MN-493D (EOR(ethylene/octene rubber)-g-MAH(maleic anhydride, MAH amount of 0.5 wt %)) manufactured by Dupont is used as a reactive olefin-based impact modifier.

(D) White Pigment

ZnS is used to express white.

Examples 1-3 and Comparative Examples 1-3

The composition components are mixed in accordance with the composition ratio (unit:parts by weight) shown in the following Table 1, and extruded by an twin screw extruder of L/D=45, Φ=45 mm under the conditions of a fixed temperature of 250° C. (examples) and 320° C. (comparative examples), a screw revolution speed of 150 rpm, and a self-supply speed of 60 kg/hr to provide pellets. The obtained pellets are dried at 100° C. for 4 hours and injected with a 10 oz injector at a injecting temperature of 260° C. (examples) and 330° C. (comparative examples) to provide a specimen for measuring physical properties. The specimen is measured to determine physical properties, and the results are shown in the following Table 1.

TABLE 1

| | | | Example | | | Comparative Example | | |
|---|---|---|---|---|---|---|---|---|
| | | | 1 | 2 | 3 | 1 | 2 | 3 |
| Composition (parts by weight) | (A) Polyarylamide resin | | 50 | 50 | 50 | — | — | — |
| | (A-1) Modified nylon-based resin | | — | — | — | 50 | 50 | 50 |
| | (B) Reinforced fiber having cross-sectional aspect ratio of 4 | | 50 | 50 | 50 | 50 | 50 | 50 |
| | (C) Impact modifier | | 3 | 3 | 3 | 3 | 3 | 3 |
| | (D) White pigment | | — | 5 | 7.5 | — | 5 | 7.5 |
| Physical Properties | ① Flexural strength (kgf/cm$^2$) | ASTM D790 | 3,680 | 3,640 | 3,470 | 3200 | 3200 | 3100 |
| | ② Flexural modulus (kgf/cm$^2$) | ASTM D790 | 170,000 | 173,000 | 171,000 | 142,000 | 141,000 | 139,000 |

TABLE 1-continued

| | | | Example | | | Comparative Example | | |
|---|---|---|---|---|---|---|---|---|
| | | | 1 | 2 | 3 | 1 | 2 | 3 |
| ③ Izod impact strength (kgf·cm/cm) | Notched Un-notched | ASTM D256 | 15.3 121 | 13.8 110 | 11.9 97 | 14.7 114 | 11.8 99.5 | 10.5 89.5 |
| ④ Color difference (L*) | | ASTM D1925 | 84.8 | 92.8 | 93.5 | 84.9 | 89.5 | 90.5 |

Method of Measuring Physical Property

Each specimen obtained from the examples and comparative examples is allowed to stand at 23° C. at a relative humidity of 50% for 48 hours in accordance with ASTM D3641.

(1) Flexural Strength

Flexural strength is measured with a specimen of width×length×thickness=127×12.7×6.4 (unit: mm) in accordance with ASTM D790, and the unit is kgf/cm².

(2) Flexural Modulus

Flexural modulus is measured with a specimen of width×length×thickness=127×12.7×6.4 (unit: mm) in accordance with ASTM D790, and the unit is kgf/cm².

(3) Izod Impact Strength

The notched specimen is measured with a ⅛ inch specimen in accordance with ASTM D256, and the un-notched specimen is also measured in accordance with the same method.

(4) Color Difference (L*)

Color difference is measured for L* (whiteness) in accordance with ASTM D1925.

As shown in Table 1, the specimens including the resin compositions of Examples 1 to 3 exhibit less decreased impact strength and improved whiteness (L*) as compared to those of Comparative Examples 1 to 3.

In addition, resin compositions according to Examples 1 to 3 have more improved flexural strength, flexural modulus, impact strength, and the like than those of Comparative Examples 1 to 3.

When Example 2 is compared to Comparative Example 3, it is confirmed that the resin composition of Example 2 has superior whiteness to that of Comparative Example 3 even though Example 2 includes less white pigment than Comparative Example 3.

Measuring Heat Resistance

Each composition obtained from Example 1 and Comparative Example 1 is extruded with a twin screw extruder of L/D=45, Φ=45 mm under the conditions of a fixed temperature of 250° C. (Example 1) and 320° C. (Comparative Example 1), a screw revolution speed of 150 rpm, and a self-supply speed of 60 kg/hr to provide pellets.

The obtained pellets are dried at 100° C. for 4 hours and injected with a 10 oz injector under the conditions of injecting temperature of 260° C. (Example 1) and 330° C. (Comparative Example 1) to provide a color chip (thickness: 1T). In order to measure the heat resistance, the injected specimens are dipped in boiling water (dipping at 100° C. for 30 minutes, and dipping at a relative humidity of 95% and 50° C. for 72 hours) and the surface change is photographed, and the results are shown in FIG. 1 to FIG. 4, respectively. FIG. 1 and FIG. 2 show a surface of the specimen according to Example 1 before it is dipped in boiling water (FIG. 1) and after it is dipped in boiling water (FIG. 2). FIG. 3 and FIG. 4 show a surface of the specimen according to Comparative Example 1 before it is dipped in boiling water (FIG. 3) and after it is dipped in boiling water (FIG. 4).

As shown in FIG. 1 to FIG. 4, the resin composition according to Example 1 has no surface change after dipping in boiling water (dipping at 100° C. for 30 minutes, and dipping at a relative humidity of 95% and 50° C. for 72 hours) compared to that of Comparative Example 1. This indicates that the resin composition of Example 1 has superior heat resistance as compared to that of Comparative Example 1.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

The invention claimed is:

1. A fiber reinforced nylon composition comprising:
(A) 25 to 75 parts by weight of a polyarylamide resin, wherein the polyarylamide resin has the following Formula 1:

[Chemical Formula 1]

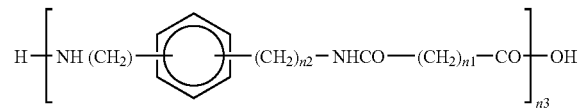

wherein, in the above formula, n1 ranges from 50 to 5000, n2 ranges from 50 to 5000, and n3 ranges from 50 to 5000, and wherein the polyarylamide resin has a weight average molecular weight of 10,000 to 100,000;
(B) 25 to 75 parts by weight of a reinforcing fiber having a cross-sectional aspect ratio of 1.5 or more; and
(C) an impact modifier,
wherein the impact modifier is included in an amount of 1 to 10 parts by weight based on 100 parts by weight of a mixture of the polyarylamide resin and reinforcing fiber.

2. The fiber reinforced nylon composition of claim 1, wherein the reinforcing fiber comprises a glass fiber, a carbon fiber, an aramide fiber, a potassium titanate fiber, or a silicon carbonate fiber.

3. The fiber reinforced nylon composition of claim 1, wherein the reinforcing fiber has a cross-sectional aspect ratio from 2 to 8.

4. The fiber reinforced nylon composition of claim 1, wherein the reinforcing fiber has a plate shape.

5. The fiber reinforced nylon composition of claim 2, wherein the plate shaped reinforcing fiber has a fiber length of 2 to 13 mm.

6. The fiber reinforced nylon composition of claim 1, wherein the impact modifier comprises an olefin-based copolymer.

7. The fiber reinforced nylon composition of claim 6, wherein the olefin-based copolymer comprises an ethylene/propylene rubber, an isoprene rubber, an ethylene/octene rubber, an ethylene-propylene-diene terpolymer (EPDM), an ethylene-methacryl acid (EMAA), an olefin graft copolymer, or a mixture thereof.

8. The fiber reinforced nylon composition of claim 6, wherein the olefin-based copolymer comprises a reactive compound, a non-reactive metal, or a combination of a reactive compound and a non-reactive metal.

9. The fiber reinforced nylon composition of claim 8, wherein the olefin-based copolymer comprises a reactive compound and is obtained by graft polymerizing 99.9 to 95 wt % of an olefin-based polymer and 0.1 to 5 wt % of a reactive compound.

10. The fiber reinforced nylon composition of claim 9, wherein the reactive compound comprises maleic anhydride, glycidylmethacrylate, or oxazoline.

11. The fiber reinforced nylon composition of claim 8, wherein the olefin-based copolymer comprises a non-reactive metal comprising zinc (Zn), iron (Fe), manganese (Mn), or a mixture thereof.

12. The fiber reinforced nylon composition of claim 1, further comprising an additive selected from the group consisting of pigments, antioxidants, thermal stabilizers, photostabilizers, fluidity enhancers, lubricants, bactericides, release agents, nucleating agents, and mixtures thereof.

13. The fiber reinforced nylon composition of claim 12, comprising said additive in an amount of 30 parts by weight or less based on 100 parts by weight of the mixture of the polyarylamide resin (A) and reinforcing fiber (B).

14. The fiber reinforced nylon composition of claim 12, wherein said additive comprises a pigment.

15. The fiber reinforced nylon composition of claim 1, comprising (A) 40 to 60 parts by weight of said polyarylamide resin; (B) 40 to 60 parts by weight of said reinforcing fiber having a cross-sectional aspect ratio of 2 to 8; and (C) 3 to 7 parts by weight of said impact modifier, based on 100 parts by weight of a mixture of the polyarylamide resin and reinforcing fiber.

16. A molded product manufactured using the fiber reinforced nylon composition according to claim 1.

* * * * *